Patented Feb. 11, 1936

2,030,476

UNITED STATES PATENT OFFICE 2,030,476

METHOD OF PRODUCING MIRRORS

Harry Edward Smith, Brooklyn, N. Y., assignor to Foster Dee Snell, Brooklyn, N. Y.

No Drawing. Application January 21, 1931, Serial No. 510,335

4 Claims. (Cl. 91—68.3)

This invention relates to an improvement in mirrors and mirror surfaces and to a method of producing the same and has for its object particularly the improvement of silver plated or silver backed mirrors and mirror surfaces to produce a more brilliant dead white mirror than those heretofore produced.

In the silver plated mirrors heretofore produced, such as flat mirror surfaces, silver plated glass flakes for artificial snow and the like, the usual cleaning and plating procedure results in the production of a mirror having, upon close examination, a decidedly yellowish color due to a brown or yellowish discoloration which takes place in the silver backing subsequent to its deposition and which exists both in the flat plated mirrors and in plated glass flakes, but is more noticeable in the glass flakes. This yellowish color is very objectionable, particularly in the glass flakes, where a brilliant white mirror surface is desired. These mirror glass flakes are ordinarily used as tinsel ornamentation, artificial snow, etc. around Christmas trees, in show windows and the like, and give the effect of freshly fallen snow and if the mirror surface of the flakes is of a yellow tinge, they cannot be used for the purpose desired.

It is one of the objects of my invention to provide plated glass flakes and plated flat glass surfaces which will have a brilliant white mirror surface and to provide a process of cleaning and preparing the glass plates and flat mirror surfaces prior to silver plating the same which will insure the production of a brilliant substantially dead white mirror at a cost comparatively lower than the present cost of producing the unsatisfactory yellowish mirror surfaces.

Other specific objects and detailed advantages of my invention will appear as this description proceeds which it will be understood describes an illustrative embodiment of my product and process from which various modifications and changes may be made without departing from the spirit of the invention.

In the usual silver plating procedure for glass mirror surfaces, the glass is first cleaned by washing with chromic acid and then with concentrated or sometimes 10% nitric acid or by washing with an alkali, such as 28% to 30% sodium hydroxide solution. The acid or alkali is then thoroughly washed from the cleaned glass surfaces and the silver plating applied in the usual manner by the use of a suitable silver solution combined with a reducing agent to cause deposition of the silver on the glass surfaces. This procedure results in the production of a yellow surface on glass flakes which is unsatisfactory.

I have found, however, that the plating may be greatly simplified and a more brilliant white mirror surface produced if the clean glass surfaces to be plated are washed with a dilute acid or alkaline solution of lead acetate or stannous chloride, or a solution of thorium nitrate. Other salts of metals which are strongly adsorbed by the glass may be used.

Another procedure for preparation of the mirror surface is to "pickle" the glass in a solution of chromic acid in concentrated sulfuric acid for several hours or at an elevated temperature. This results in the solution from the glass of sodium compounds, leaving a glass surface of silicon dioxide or silica.

After either of the above treatments, the glass is washed with distilled or tap water, and then plated with a suitable silver plating composition. In this way a brilliant white or bluish white mirror surface is produced which is free from the yellowish tinge produced by the previous practice of plating glass and which holds this brilliancy and whiteness throughout the life of the mirror.

The glass flakes or flat mirror surfaces cleaned by either of the above procedures are preferably washed with dilute (0.1%) freshly prepared acid or alkaline solutions of lead acetate, stannous chloride or thorium nitrate and the lead acetate, stannous chloride or thorium nitrate may be washed from the surfaces with ordinary tap water and the surfaces then plated in the usual way.

Two alternative theories may account for the function of the metal salt solution and are inserted here for purpose of explanation only. Regardless of which solution is used the glass surface unquestionably adsorbs a layer of metal ion, metal oxide or acid or basic salt according to the solution used. It is possible that this acts as a catalyst, providing nuclei for reduction of silver oxide at the glass surface. A more probable explanation is that this strongly adsorbed layer protects the glass surface until the silver solution is added and is then displaced by silver oxide which is subsequently reduced to metallic silver. According to this last theory the adsorbed layer may be described as protecting the clean surface of the glass during the necessary period of operations from cleaning to application of the silver solution. This is not presented as precluding other theories, nor is the invention necessarily limited to these specific materials for protecting the glass surface prior to the deposition of the silver to give a better color and brilliancy than possible with the previous cleaning and washing solutions. Ordinary tap water may be used to wash the glass flakes or flat glass surfaces before the metallic salt treatment and also to wash the excess of metallic salts from the glass before silvering.

Although any preferred silvering solution may be used to plate the glass flakes or glass surfaces prepared in the way previously described, in order to get a brilliant white mirror surface, I find it necessary to use 10% silver nitrate solution to which 5% of ammonia is added until the precipitate formed is nearly but not quite dissolved. At this point a 10% solution of sodium hydroxide is added until a purplish black precipitate is formed and this is substantially but not entirely redissolved by the addition of more ammonia. The solution thus prepared and an 8% dextrose solution are poured simultaneously upon the flat mirror surfaces or into the bath for plating the glass flakes and the mass is suitably agitated to insure uniform deposition on all parts of the surface to be plated. After the plating is completed, the glass flakes or flat mirror surfaces may be washed with tap water until the wash water is clear and neutral to red litmus and the material is immediately dried in an atmosphere free from sulphur, hydrogen sulfide or other discoloring constituents. The mirror surfaces prepared in this way are of brilliant white or bluish white as distinguished from the usual silver mirror surfaces which develop a yellow discoloration.

I claim:

1. The method of silvering glass which comprises cleaning the glass flakes with nitric acid to remove sodium ions, washing the cleaned glass surface with a dilute solution of a substance of the group consisting of lead acetate, stannous chloride and thorium nitrate to cause adsorption by the glass of metal ions, washing the glass with water and silvering the treated surface by pouring thereon a cold solution of silver nitrate together with a cold solution of dextrose, substantially as described.

2. The method of silvering glass flakes which consists of cleaning the glass with material of the group consisting of chromic acid in concentrated sulfuric acid or concentrated nitric acid to remove sodium ions, washing the cleaned glass surface with water and then with a freshly prepared dilute solution of material of the group consisting of lead acetate, stannous chloride and thorium nitrate to cause adsorption by the glass of metal ions, washing the glass with water and silvering the freshly treated surface with a cold solution of silver nitrate freshly combined with a cold solution of dextrose, substantially as described.

3. The method of silvering glass flakes which consists of cleaning the glass flakes with nitric acid to remove sodium ions, washing the thus cleaned surfaces with a freshly prepared dilute solution of stannous chloride to cause adsorption by the glass of tin ions, washing the glass flakes with water and silvering the treated surface by pouring thereon a cold solution of silver nitrate together with a cold solution of dextrose, substantially as described.

4. The method of producing clear silvered glass flakes, which comprises cleaning the glass flakes, washing the cleaned glass flakes, treating the glass flakes with a freshly prepared dilute stannous chloride solution, washing the glass flakes with water, plating the glass flakes with a solution of silver nitrate and dextrose, washing the plated glass flakes and drying the same.

HARRY E. SMITH.